(12) United States Patent
Loretizo et al.

(10) Patent No.: US 10,725,414 B2
(45) Date of Patent: Jul. 28, 2020

(54) IMAGE FORMING APPARATUS THAT DISPLAYS JOB LIST

(71) Applicant: KYOCERA Document Solutions Inc., Osaka (JP)

(72) Inventors: Jobern Loretizo, Osaka (JP); Carlo Nino Bitoon, Osaka (JP); Felar Helen Sabagkit, Osaka (JP); Beverlyn Lascuna, Osaka (JP); Evan Wilson Benitez, Osaka (JP); Katrina Star Casera, Osaka (JP); Kris Antonette Lapiz, Osaka (JP); Jay Balunan, Osaka (JP); Miguel Inaki William Paday V, Osaka (JP); Junaico Segismar, Osaka (JP); Nolan Iway, Osaka (JP); Crescencio Sabal, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/346,261

(22) PCT Filed: Jan. 31, 2017

(86) PCT No.: PCT/JP2017/003429
§ 371 (c)(1),
(2) Date: Apr. 30, 2019

(87) PCT Pub. No.: WO2018/142474
PCT Pub. Date: Aug. 9, 2018

(65) Prior Publication Data
US 2020/0064764 A1   Feb. 27, 2020

(51) Int. Cl.
*G03G 15/00* (2006.01)
*H04N 1/44* (2006.01)
*H04N 1/00* (2006.01)
*G06F 3/0488* (2013.01)

(52) U.S. Cl.
CPC ....... *G03G 15/502* (2013.01); *H04N 1/00331* (2013.01); *H04N 1/00411* (2013.01); *H04N 1/444* (2013.01); *H04N 1/448* (2013.01); *H04N 1/4413* (2013.01); *G06F 3/04883* (2013.01); *H04N 2201/0094* (2013.01)

(58) Field of Classification Search
CPC .... H04N 1/444; H04N 1/448; H04N 1/00331; H04N 1/4413; G06F 3/04883
See application file for complete search history.

(56) References Cited

FOREIGN PATENT DOCUMENTS

| JP | 2004-199409 A | 7/2004 |
|---|---|---|
| JP | 2004304291 A | * 10/2004 |
| JP | 2006-163261 A | 6/2006 |

* cited by examiner

*Primary Examiner* — Walter L Lindsay, Jr.
*Assistant Examiner* — Milton Gonzalez
(74) *Attorney, Agent, or Firm* — IP Business Solutions, LLC

(57) ABSTRACT

While jobs with confidentiality are in principle kept from showing on a job list, display of the jobs with confidentiality is enabled with a simple operation. In an image forming apparatus, a display control section allows a display section to display a job list showing a plurality of executed jobs, wherein among the jobs, one job containing a predetermined word or character string representing confidentiality is excluded from the job list. When a predetermined keyword is input through a touch panel, the display control section allows the display section to display a confidential job containing the keyword.

6 Claims, 11 Drawing Sheets

Fig.4

| JOB NUMBER | TERMINATION DATE AND TIME | TYPE | NAME | USER NAME | RESULT | DISPLAY/ HIDE |
|---|---|---|---|---|---|---|
| 0025 | 08/24 19:00 | SCAN | TECHNICAL G | A-KO | COMPLETED | HIDE |
| 0026 | 08/24 20:00 | PRINT | CLERICAL H | B-YO | INTERRUPTED | DISPLAY |
| 0027 | 08/27 09:00 | SCAN | TECHNICAL J | C-RO | COMPLETED | DISPLAY |
| 0028 | 08/27 09:08 | FAX | TECHNICAL K | D-TA | FAILED | DISPLAY |
| 0029 | 08/27 09:25 | PRINT | TECHNICAL M | A-KO | COMPLETED | HIDE |
| 0030 | 08/24 10:00 | SCAN | SENSITIVE X | B-YO | QUEUED | HIDE |
| 0031 | 08/24 10:06 | SCAN | TECHNICAL J | C-RO | QUEUED | DISPLAY |
| ---- | ---- | ---- | ---- | ---- | ---- | ---- |

Fig.7

| JOB NUMBER | TERMINATION DATE AND TIME | TYPE | NAME | USER NAME | RESULT |
|---|---|---|---|---|---|
| 0026 | 08/24 20:00 | PRINT | CLERICAL H | B-YO | INTERRUPTED |
| 0027 | 08/27 09:00 | SCAN | TECHNICAL J | C-RO | COMPLETED |
| 0028 | 08/27 09:08 | FAX | TECHNICAL K | D-TA | FAILED |
| 0031 | 08/24 10:06 | SCAN | TECHNICAL J | C-RO | QUEUED |

DJL

| JOB NUMBER | TERMINATION DATE AND TIME | TYPE | NAME | USER NAME | RESULT |
|---|---|---|---|---|---|
| 0026 | 00/24 20:00 | PRINT | CLERICAL I | B YO | INTERRUPTED |
| 0027 | 00/27 09:00 | SCAN | CLERICAL J | O HO | COMPLETED |
| 0028 | 00/27 09:00 | FAX | TECHNICAL K | O TA | FAILED |
| 0029 | 00/24 10:08 | SCAN | TECHNICAL J | O OO | QUEUED |

Fig.9

| JOB NUMBER | TERMINATION DATE AND TIME | TYPE | NAME | USER NAME | RESULT |
|---|---|---|---|---|---|
| 0030 | 08/24 10:00 | SCAN | SENSITIVE X | B-YO | QUEUED |

| JOB NUMBER | TERMINATION DATE AND TIME | TYPE | NAME | USER NAME | RESULT |
|---|---|---|---|---|---|
| 0025 | 08/24 19:00 | SCAN | TECHNICALL G | A-KO | COMPLETED |
| 0029 | 08/27 09:25 | PRINT | TECHNICALL M | A-KO | COMPLETED |

32

IMAGE FORMING APPARATUS THAT DISPLAYS JOB LIST

TECHNICAL FIELD

The present invention relates to image forming apparatuses and particularly relates to a technique for displaying a job list.

BACKGROUND ART

There is an image forming apparatus in which each time a job, such as transmission from a scanner, is executed, information on the job is saved and a job log showing a plurality of jobs is created, and a display section is allowed to display the job log in response to a user's operation or the like. However, it is undesirable from a security viewpoint that the job list can always be viewed by anybody.

To cope with this, in Patent Literature 1, a plurality of users are given their respective security levels and settings are made so that a user given a lower security level cannot view jobs for a user given a higher security level. Furthermore, settings are made so that all jobs can be viewed by the input of a password.

Alternatively, in Patent Literature 2, items of job attributes are set as objects of hiding and settings are made so that the contents of the items set as objects of hiding are not shown in the job log.

CITATION LIST

Patent Literature

Patent Literature 1: JP-A-2006-163261
Patent Literature 2: JP-A-2004-199409

SUMMARY OF INVENTION

Technical Problem

However, in both Patent Literatures 1 and 2, even a job with confidentiality is displayed in a job log so long as conditions are satisfied. On the other hand, it is inconvenient that users cannot at all confirm jobs with confidentiality in the job log.

The present invention has been made in view of the foregoing circumstances and has an object of in principle keeping jobs with confidentiality from showing on a job list and making the jobs with confidentiality displayable with a simple operation.

Solution to Problem

An image forming apparatus according to an aspect of the present invention includes: a display section; an operating section operable by a user; a job list generating section that generates a job list showing a plurality of executed jobs; a determination section that, when a predetermined word or character string representing confidentiality is contained in one of the jobs, determines the job to be confidential; and a display control section that allows the display section to display the job list generated by the job list generating section but, in presence of the job determined to be confidential by the determination section, allows the display section to display the jobs other than the job determined to be confidential on a display screen by excluding the job determined to be confidential from the job list, wherein when a keyword is input by an operation of the operating section and the input keyword is contained in the job determined to be confidential, the display control section allows the display section to display the job determined to be confidential.

Advantageous Effects of Invention

The present invention enables jobs with confidentiality to be in principle kept from showing on a job list and enables the jobs with confidentiality to be displayed with a simple operation. Thus, the confidentiality during display of the job list can be ensured and simultaneously the inconvenience of an inability to confirm jobs with confidentiality can be eliminated.

BRIEF DESCRIPTION OF DRAWINGS

FIG. 4 is a table conceptually showing a job list.

FIG. 7 is a view showing a job list for display displayed on the display section.

FIG. 8A is a view showing a state where an image of the job list for display displayed on the display section is blurred.

FIG. 9 is a view showing a confidential job displayed on the display section.

FIG. 10 is a view showing other confidential jobs displayed on the display section.

DESCRIPTION OF EMBODIMENTS

Figure 1:
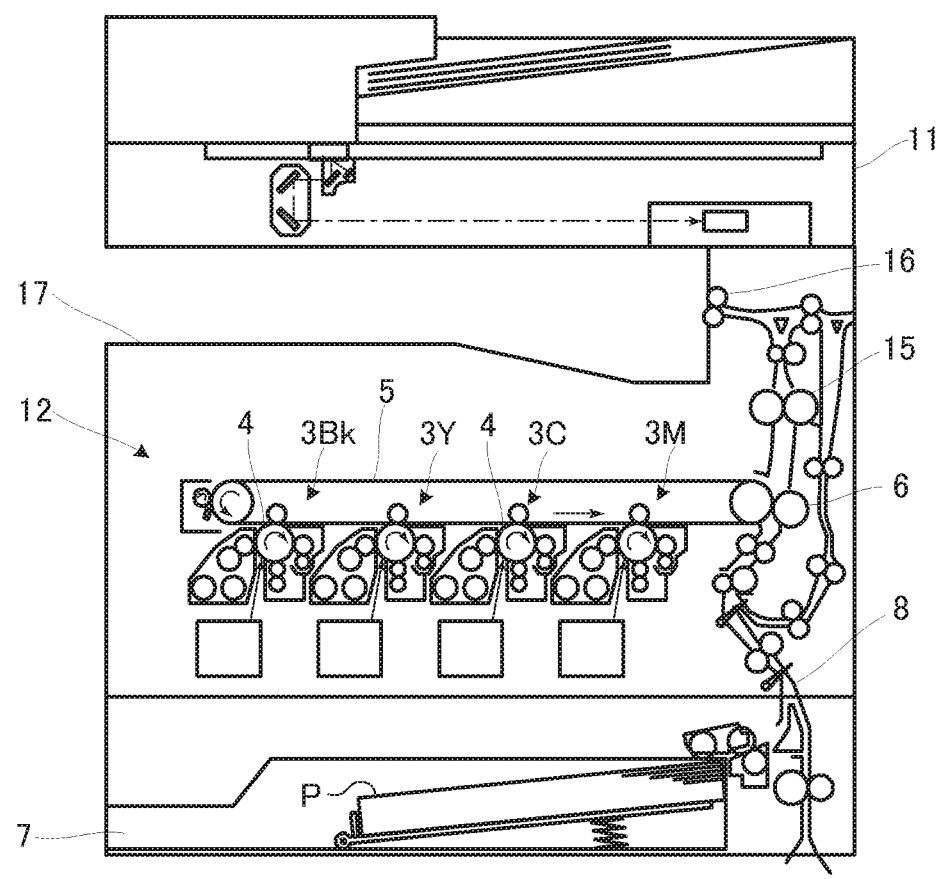
FIG. 1 is a cross-sectional view showing an image forming apparatus according to an embodiment of the present invention.

Hereinafter, a description will be given of an embodiment of the present invention with reference to the drawings. FIG. 1 is a cross-sectional view showing an image forming apparatus according to an embodiment of the present invention. The image forming apparatus 10 according to this embodiment includes an image reading section 11 and an image forming section 12.

The image reading section 11 includes a scanner that optically reads an original document and generates image data representing an image of this original document.

The image forming section 12 is a section that prints on a recording paper sheet the image represented by the image data generated by the image reading section 11, and includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light to form an electrostatic latent image on the surface of the photosensitive drum 4, develops the electrostatic latent image on the surface of the photosensitive drum 4 into a toner image, and transfers the toner image on the surface of the photosensitive drum 4 to an intermediate transfer belt 5. Thus, a multicolor toner image (an image) is formed on the intermediate transfer belt 5. This multicolor toner image is secondarily transferred, at a nip region between the intermediate transfer belt 5 and a secondary transfer roller 6, to a recording paper sheet P conveyed from a sheet feed cassette 7 via a conveyance path 8.

Thereafter, heat and pressure are applied to the recording paper sheet P by a fixing device 15, so that the toner image on the recording paper sheet P is fixed by heat and pressure. Then, the recording paper sheet P is discharged through an ejection roller pair 16 to a sheet output tray 17.

Figure 2:
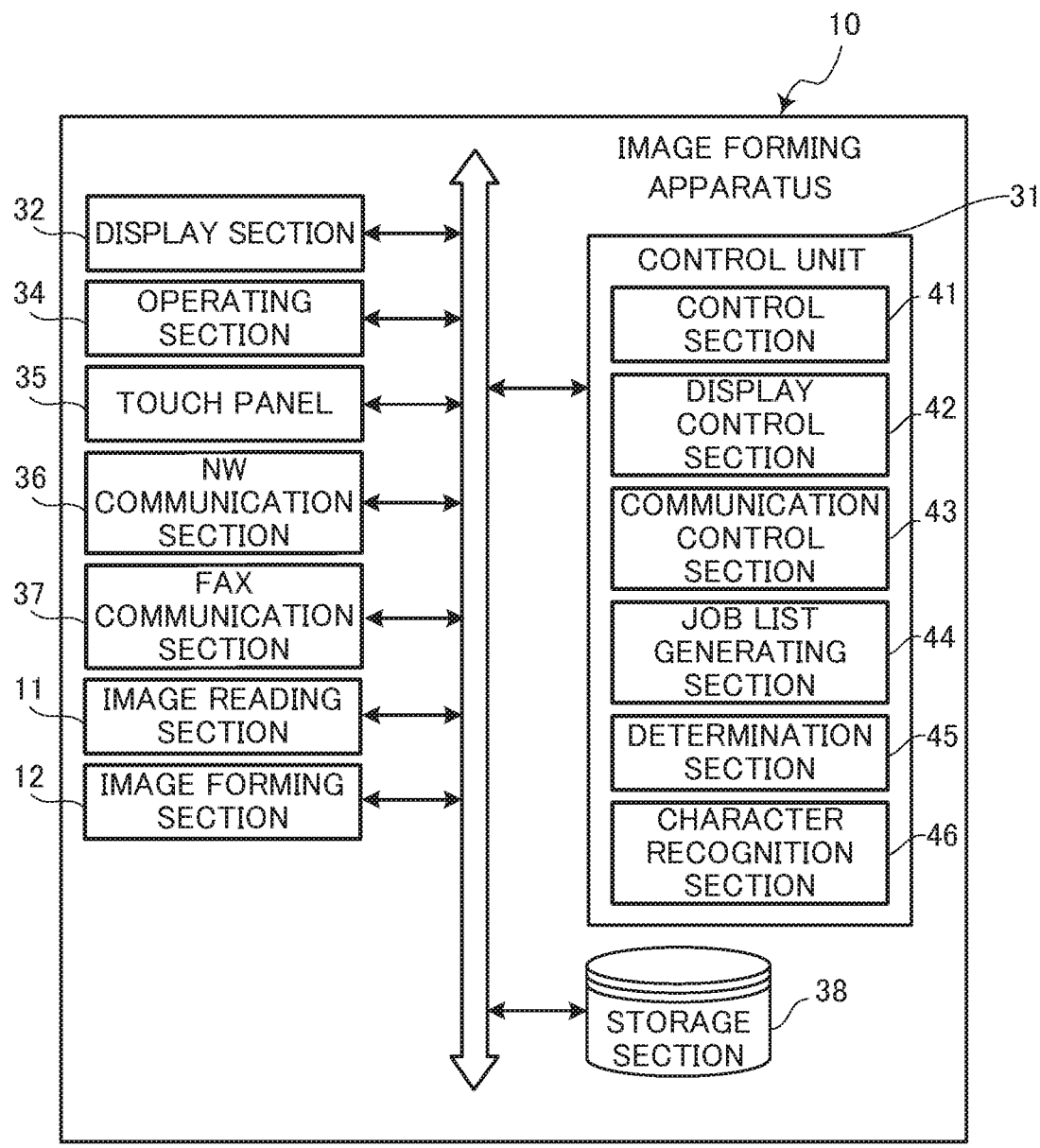
FIG. 2 is a block diagram showing the image forming apparatus according to the embodiment.

FIG. 2 is a functional block diagram showing an essential internal configuration of the image forming apparatus 10. As shown in FIG. 2, the image forming apparatus 10 includes a control unit 31, a display section 32, an operating section 34, a touch panel 35, a network communication section 36, a facsimile communication section 37, a storage section 38, the image reading section 11, the image forming section 12, and so on. These components can transfer data or signals to and from one another via a bus.

The display section 32 is formed of a liquid crystal display (LCD), an organic EL (OLED: Organic Light-Emitting Diode) display or the like.

The operating section 34 includes, for example, a menu key for calling up a menu to be displayed on the screen of the display section 32, arrow keys for moving the focus of a GUI forming the menu, a determination key for performing a determination operation for the GUI forming the menu, and a Start key.

The touch panel 35 is placed over the screen of the display section 32. The touch panel 35 is a touch panel of a so-called resistive film system, a capacitance system or any other system, detects a touch on the touch panel 35 with a user's finger or the like, together with a point of touch, and thus allows a user's instruction for the GUI or the like on the screen of the display section 32 to be input. Therefore, the touch panel 35 serves as an operating section through which a user's operation by gesture on the screen of the display section 32 is to be input.

The network communication section 36 transfers various types of data to and from other terminal devices (not shown) via a network N. The facsimile communication section 37 transfers image data to and from other image forming apparatuses, facsimile devices (not shown), and so on via the network N.

The storage section 38 is formed of an HDD (Hard Disk Drive) or the like and stores various types of data and programs.

The control unit 31 is composed of a processor, a RAM (Random Access Memory), a ROM (Read Only Memory), and so on. The processor is a CPU (Central Processing Unit), an MPU, an ASIC or the like. When a program stored in the above storage section 38 is executed by the above processor, the control unit 31 functions as a control section 41, a display control section 42, a communication control section 43, a job list generating section 44, a determination section 45, and a character recognition section 46. Alternatively, each of the control section 41, the display control section 42, the communication control section 43, the job list generating section 44, the determination section 45, and the character recognition section 46 of the control unit 31 may not be implemented by the operation in accordance with the program but may be constituted by a hardware circuit.

The control section 41 governs the overall operation control of the image forming apparatus 10.

The display control section 42 controls the display section 32 to allow the display section 32 to display the above-mentioned GUI, various type of information or so on.

The communication control section 43 has the function of controlling the communication operations of the network communication section 36 and the facsimile communication section 37.

The job list generating section 44 generates a job list showing a plurality of jobs to be executed and already executed by the control section 41. The job list generating section 44 allows jobs to be executed and already executed by the control section 41 to be stored, for example, in the RAM built into the control unit 31. The RAM is an example of the storage section defined in Claims. The display control section 42 generates, for display on the display section 32, an image representing a list of the above jobs (hereinafter, referred to as a job list).

The determination section 45 determines whether or not data making up a job contains a predetermined word or character string representing confidentiality and, when determining that the data making up the job contains the word or character string, decides that the job is confidential.

The character recognition section 46 recognizes characters input in handwriting by touch gestures on the touch panel 35. The character recognition section 46 performs this character recognition by a known technique. An application program and data for this character recognition processing are stored in the storage section 38. Furthermore, the character recognition section 46 has a well-known OCR function of analyzing an image contained as print target data in the job to recognize characters (a text) contained in the image. An application program and data for this OCR function are stored in the storage section 38.

On the image forming apparatus 10 having the above structure and configuration, the user operates the operating section 34 or the touch panel 35 to give a job for executing one of a facsimile communication function, a copy function, a print function, and a scan function. For example, when a job for executing a copy function is given, the control section 41 allows the image reading section 11 to read an image of an original document and allows the image forming section 12 and other sections to print the image of the original document on a recording paper sheet. For another example, when a job for executing the scan function is given, the control section 41 allows the image reading section 11 to read an image of an original document and the communication control section 43 allows the network communication section 36 to transmit the read image to a network-connected computer.

For still another example, when a job for executing the facsimile function is given, the control section 41 allows the image reading section 11 to read an image of an original document and allows the facsimile communication section 37 to transmit image data representing the image via a public telephone network to a communication partner. Furthermore, image data having been transmitted from a communication partner to the image forming apparatus 10 by facsimile communication is received by the facsimile communication section 37 and stored in the storage section 38 and an image represented by the image data is recorded on a recording paper sheet by the image forming section 12.

Alternatively, based on a well-known communication protocol, an execution of a job using the print function or the facsimile function can be instructed from a terminal device via a network to the image forming apparatus 10. In the image forming apparatus 10, the job is received by the network communication section 36 and the control section 41 executes the job.

Furthermore, each time the control section 41 executes a job, the job list generating section 44 updates the job list by adding information on the job to the job list. This job list shows a plurality of jobs executed on the image forming apparatus 10 and is a list of the jobs. Then, when the user operates the touch panel 35 to give an instruction to show the job list, the display control section 42 allows the display section 32 to display the job list.

Moreover, if, upon generation of a job list by the job list generating section 44, a job determined to be confidential by the determination section 45 (what is hereinafter called a confidential job refers to such a job determined to be confidential) is present in the job list, the display control section 42 excludes the job determined to be confidential from the job list and allows the display section 32 to display as a job list the jobs other than the job determined to be confidential on the display screen. In other words, the job list generated by the job list generating section 44 includes the job determined to be confidential, but the display control section 42 allows the display section 32 to display the job list exclusive of the confidential job on the screen. Therefore, the job list displayed on the display section 32 does not include the confidential job.

Then, when the user makes a predetermined gesture, for example, a hold-down touch gesture, on the job list on the screen of the display section 32 through the touch panel 35, the display control section 42 changes the display state of the image representing the job list. For example, the display control section 42 allows the display section 32 to display the image representing the job list in a blurred state. When the display control section 42 changes the display state, the control section 41 makes the input of a keyword ready to be accepted by the operating section 34 and the touch panel 35. By this change of the display state, the user can be made aware that the input of a keyword has become ready to be accepted by the operating section 34 and the touch panel 35.

After the change of the display state, the user makes touch gestures on the touch panel 35 to input in handwriting a keyword contained in the confidential job desired to be displayed. The character recognition section 46 recognizes the keyword. Also, the character recognition section 46 analyzes an image contained as print target data in each job included on the job list being stored in the RAM according to the job list generating section 44 to recognize, for each job, characters contained in the image. The display control section 42 reads out, among the jobs on the job list, a confidential job containing characters identical to the keyword recognized from the input based on the handwriting input and allows the display section 32 to display a job list with the read confidential job included thereon.

Therefore, by incorporating a predetermined word or character string representing confidentiality into the name of a job desired to be made confidential or an image contained in the job desired to be made confidential, the user can make the job a confidential job and keep the job from showing on a job list. Furthermore, if the user desires to confirm this job made a confidential job, the user can allow the display section 32 to display the confidential job having been hidden until then by making the above-mentioned hold-down touch gesture through the touch panel 35 on the screen of the display section 32 and inputting the predetermined word or character string representing confidentiality as the keyword in handwriting.

Figure 3:
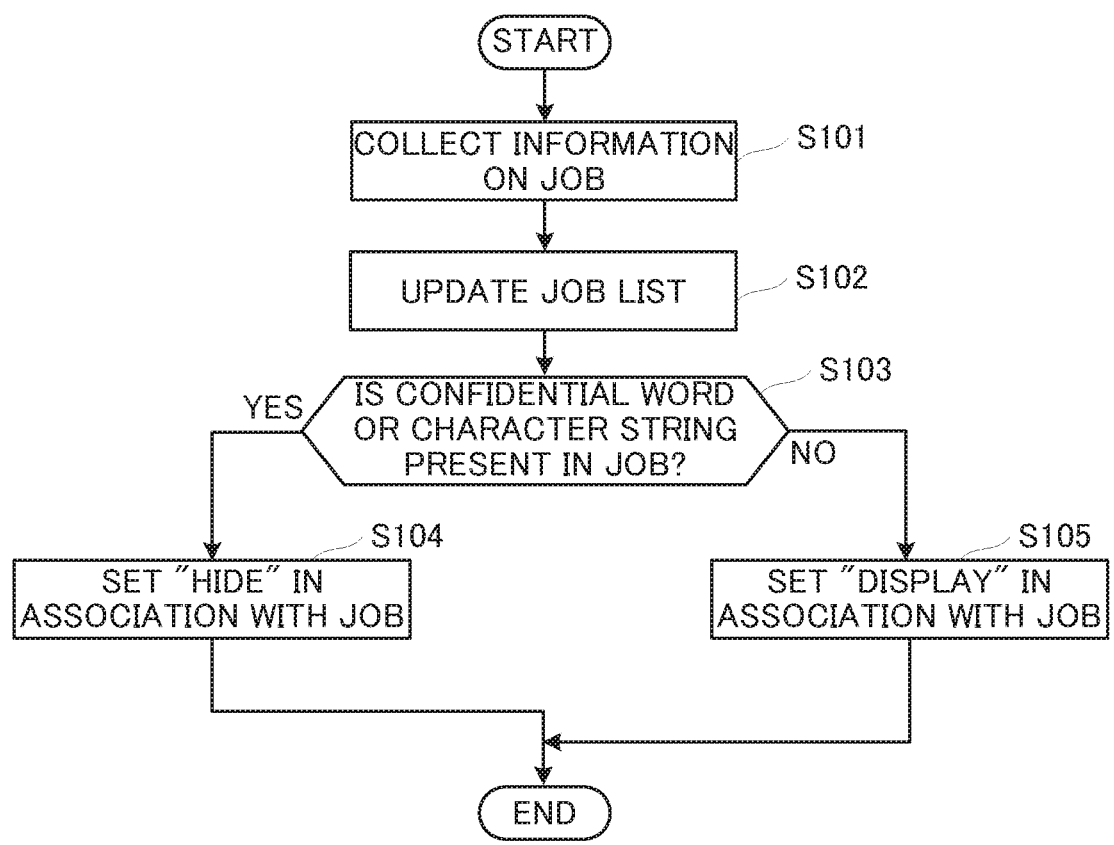
FIG. 3 is a flowchart showing job list display processing by the image forming apparatus.

Next, a description will be given of job list display processing by the image forming apparatus 10. FIG. 3 is a flowchart showing the job list display processing by the image forming apparatus 10.

When in the image forming apparatus 10 the control section 41 accepts an instruction to execute a job for one of the copy function, the print function, and the scan function, the job list generating section 44 collects information on the job (S101) and adds the information on the job to a job list JL being stored in the RAM at this point of time to update the job list JL (S102).

FIG. 4 shows the job list JL. As described previously, the job list generating section 44 generates a job list showing a plurality of jobs to be executed and already executed by the control section 41. On this job list JL, respective pieces of information on the number of job, the termination date and time of job, the type of job, the name of job, the user name, the result of job, "Display" or "Hide" of job, and so on are associated with each other. The number of job is generated based on the order of execution of jobs by the job list generating section 44. The termination date and time of job is the date and time when each job has terminated, and is set by the job list generating section 44. The type of job is copy, print, scan or so on. The name of job and the user name are those input in handwriting by touch gestures on the touch panel 35 and recognized by the character recognition section 46. The result of job indicates that each job has been completed, has been interrupted, has failed or has been queued or other results, and is set by the job list generating section 44. The "Display" or "Hide" of job indicates whether or not the job should be included on a job list displayed on the display section 32, i.e., whether or not the job is a confidential job (to be described hereinafter).

The determination section 45 determines whether or not a predetermined word or character string representing confidentiality is present in data indicating the name of the job or characters analyzed from an image contained as print target data in the job by the character recognition section 46 (S103). When determining that neither word nor character string representing confidentiality is present ("No" in S103), the determination section 45 determines the job not to be confidential and sets "Display" in association with the job on the job list JL (S105).

On the other hand, when determining that a word or character string representing confidentiality is present ("Yes" in S103), the determination section 45 determines the job to be confidential and sets "Hide" in association with the job on the job list JL (S104).

Examples of the word or character string representing confidentiality include "sensitive", "secret", and "confidential". The word or character string representing confidentiality is previously stored in the storage section 38, read out from the storage section 38 by the determination section 45, and used for determination in S103 by the determination section 45. Furthermore, the word or character string representing confidentiality may comprise a single word or character string or a plurality of words or character strings. For a confidential word or character string comprising a plurality of words or character strings, when determining that at least one of the plurality of words or character strings representing confidentiality is contained in the name of the job or the image for the job, the determination section 45 determines the job to be confidential and sets "Hide" for the job.

Figure 5:
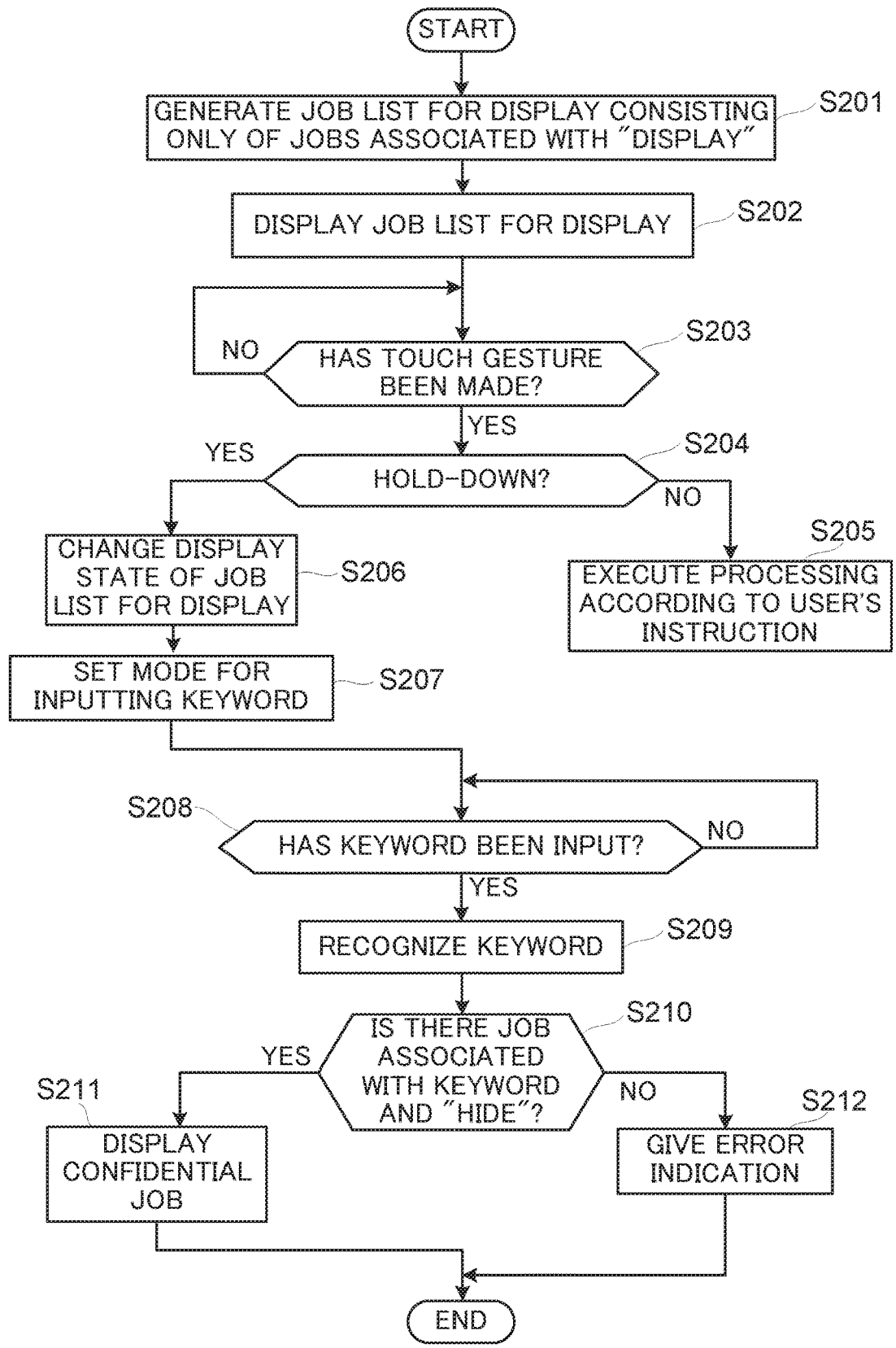
FIG. 5 is a flowchart showing processing for switching between display and hiding of confidential jobs in displaying the job list.

Next, a description will be given of processing for switching between display and hiding of confidential jobs in displaying the job list. FIG. 5 is a flowchart showing the processing for switching between display and hiding of confidential jobs in displaying the job list.

Figure 6:
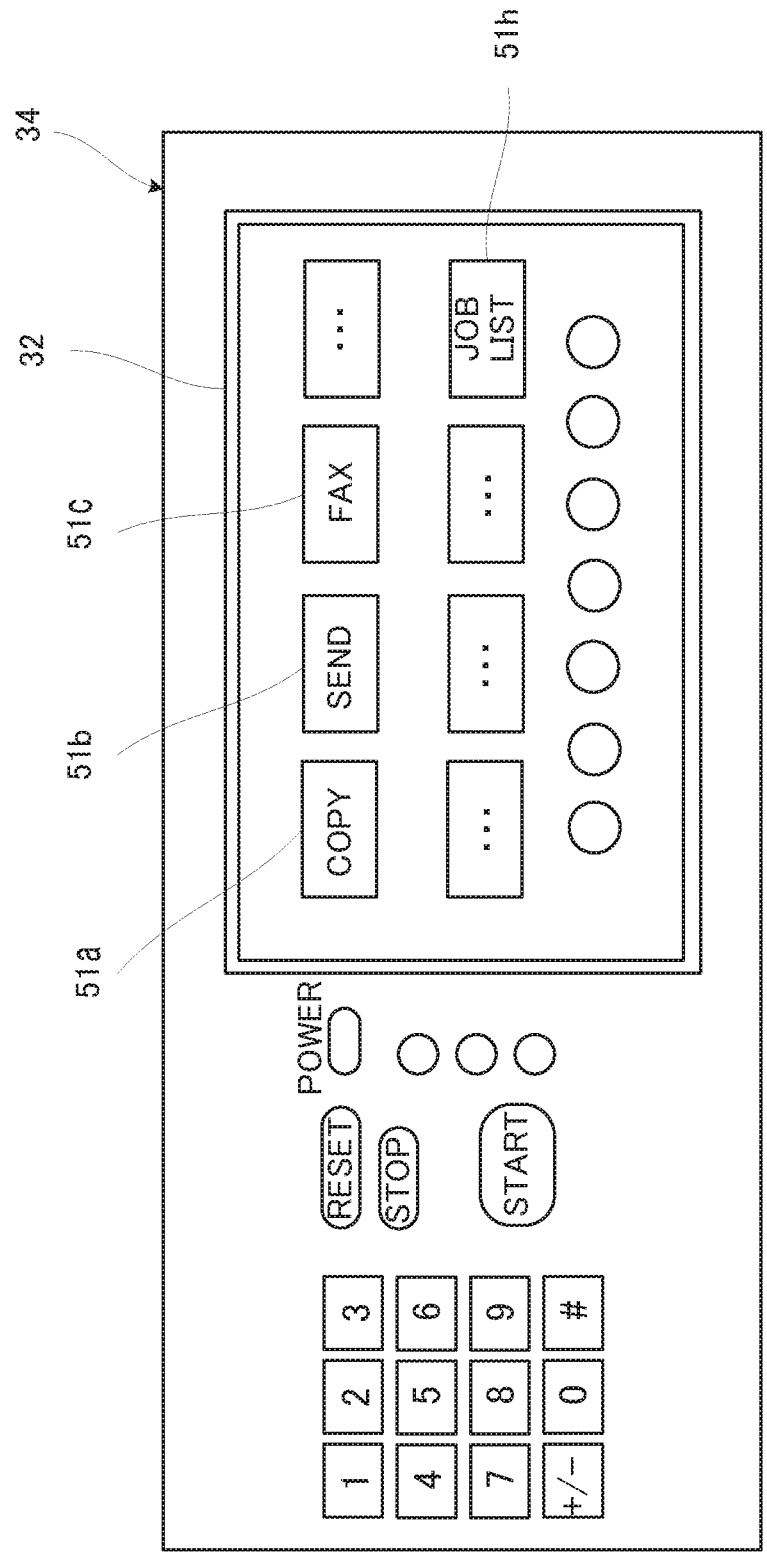
FIG. 6 is a view showing an initial screen image displayed on a display section.

First, the display control section 42 allows the display section 32 of the image forming apparatus 10 to display as an initial screen image a plurality of touch keys 51a to 51h associated with individual functions and other images as shown in FIG. 6. When in this state the user makes a touch gesture on the touch key 51h associated with the job list, the control section 41 detects the touch gesture on the touch key 51h through the touch panel 35. The display control section 42 reads out the job list JL shown in FIG. 4 from the above RAM, selects only jobs associated with "Display" from the job list JL, generates a job list image DJL for display consisting only of the jobs associated with "Display" (S201), and allows the display section 32 to display the job list DJL for display (S202). Therefore, no job associated with "Hide" on the job list JL shown in FIG. 4 is displayed on the job list DJL for display.

FIG. 7 shows an example of the job list DJL for display displayed on the display section 32. On this job list DJL for display, only the jobs associated with "Display" on the job list JL shown in FIG. 4 are placed and no job associated with "Hide" is included. Furthermore, on the job list DJL for display, the number of job, the termination date and time of job, the type of job, the name of job, the user name, the result of job, and so on are shown in association with each other. Moreover, the display control section 42 allows the display of a scroll bar 52 on the right side of the job list DJL for display. When the user makes a touch gesture on the scroll bar 52 to move the scroll bar 52 up and down, the touch panel 35 accepts the touch gesture on the scroll bar 52 and the display control section 42 provides a scrolling display of the jobs on the job list DJL for display. The user can confirm each job by viewing the job list DJL for display.

With the job list DJL for display displayed, the control section 41 waits for a touch gesture on the touch panel 35 ("No" in S203). When the touch gesture is made ("Yes" in S203), the control section 41 determines whether or not the touch gesture is a hold-down continued for a predetermined specified time or longer (S204).

Then, if the touch gesture is not a hold-down continued for the specified time or longer ("No" in S204), this means that the touch gesture is a normal touch gesture and, therefore, the control section 41 identifies a user's instruction based on the touch gesture and executes processing according to this instruction (S205).

On the other hand, if the control section 41 determines that the touch gesture is a hold-down continued for the specified time or longer ("Yes" in S204), the display control section 42 changes the display state of the job list DJL for display on the screen of the display section 32 (S206). When the display state is changed by the display control section 42 in this manner, the control section 41 makes the touch panel 35 ready to accept the input of the keyword (S207). For example, the display control section 42 allows the display section 32 to display the image of the job list DJL for display in a blurred state as shown in FIG. 8A. Alternatively, the display control section 42 allows the display section 32 to display the image of the job list DJL for display like a mosaic. Still alternatively, the display control section 42 may allow the display section 32 to display the image of the job list DJL for display in a grayed-out manner.

Figure 8B:
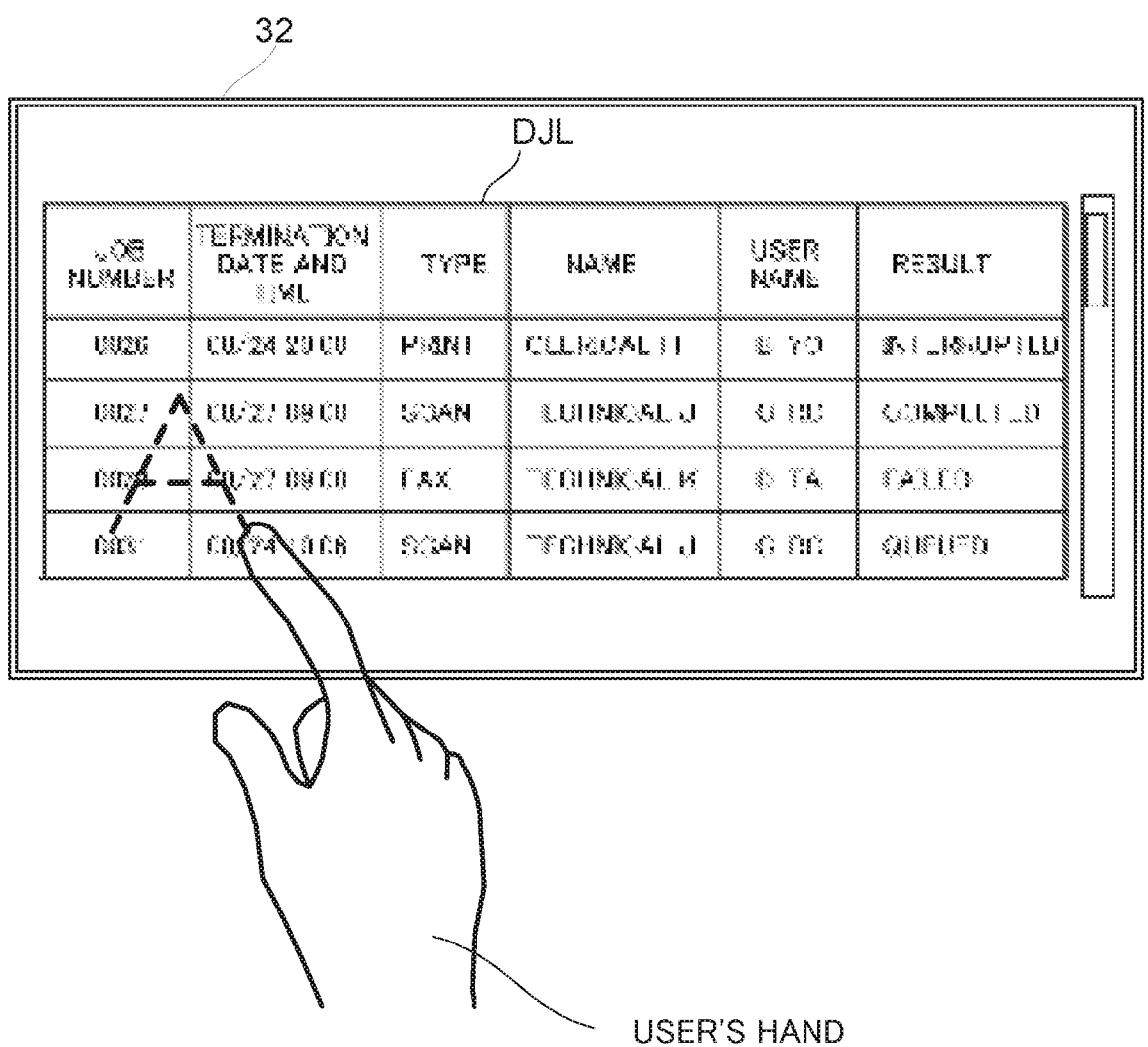
FIG. 8B is a view showing how a user inputs a character in handwriting during display of the blurred image of the job list on the display section.

Since as just described the display state of the job list DJL for display is changed, the user can recognize that the touch panel 35 is ready to accept the input of a keyword related to a hidden confidential job. Furthermore, when the display state is changed as described above, the control section 41 makes the operating section 34 (touch panel 35) ready to accept handwriting input of the keyword. In other words, in order to accept an instruction to display a hidden confidential job from the user, the control section 41 makes the operating section 34 (touch panel 35) available for handwriting input thereon. The user makes touch gestures on the touch panel 35 to input in handwriting a keyword related to a confidential job (in relation to which an example is shown in FIG. 8B). This keyword is, for example, the name of the job set for "Hide" on the job list JL shown in FIG. 4 or the user name.

After the control section 41 makes the touch panel 35 ready to accept the input of a keyword related to a hidden confidential job, the character recognition section 46 waits for the handwriting input of the keyword ("No" in S208). When the keyword is input through the touch panel 35 ("Yes" in S208), the character recognition section 46 recognizes this keyword (S209).

In doing so, the character recognition section 46 also analyzes an image contained as print target data in each job included on the job list being stored in the RAM according to the job list generating section 44 to recognize, for each job, characters contained in the image. The display control section 42 search for, among the jobs on the job list, a job (i.e., confidential job) containing characters identical to the keyword recognized from the input based on the handwriting input and set for "Hide" as described above. In the presence of the appropriate job ("Yes" in S210), the display control section 42 allows the display section 32 to display the job, i.e., the confidential job (S211). In other words, the display control section allows the display section 32 to display, instead of the job list DJL for display, the confidential job. Alternatively, the display control section 42 may allow the display section 32 to display the job list DJL for display with the above confidential job further included thereon.

On the other hand, in the absence of any appropriate job ("No" in S210), the display control section 42 allows the display section 32 to give an error indication (S212).

For example, when "Sensitive X" is input as a keyword, the job list JL shown in FIG. 4 is searched for a confidential job having a job name of "Sensitive X" and set for "Hide" and an appropriate confidential job is displayed on the display section 32 as shown in FIG. 9.

As just described, in this embodiment, when the user previously incorporates a word or character string representing confidentiality into the name of a job or the image related to the job, the job is associated with "Hide" on the job list JL shown in FIG. 4 and the job is excluded from the job list DJL for display shown in FIG. 7 and not displayed on the display section 32. Furthermore, when the user makes a hold-down touch gesture on the job list DJL for display shown in FIG. 7 through the touch panel 35, the display state of the job list DJL for display is changed so that the input of a keyword related to a confidential job is ready to be input. When in this state the user inputs a keyword related to a confidential job in handwriting through the touch panel 35, the confidential job containing this keyword is displayed on the display section 32. Therefore, the user can switch between display and hiding of a job of his/her own on the job list with a simple operation.

Hence, this embodiment enables jobs with confidentiality to be kept in principle from showing on a job list and enables the jobs with confidentiality to be displayed with a simple operation. Thus, the confidentiality during display of the job list can be ensured and simultaneously the inconvenience of an inability to confirm jobs with confidentiality can be eliminated.

Alternatively, in the processing in S210, the display control section 42 may extract, from among jobs set for "Hide" on the job list JL, a job or jobs having the input keyword as the user name, which are confidential job(s) to be displayed in S211. For example, when the user name "A-ko" is input through the touch panel 35, the display control section 42 searches for, on the job list JL shown in FIG. 4, confidential jobs having the user name "A-ko" and set for "Hide" and allows the display section 32 to display the confidential jobs as shown in FIG. 10.

Although in the above embodiment a hold-down touch gesture is made on the job list DJL for display, the display control section 42 may change the display state of the job list DJL for display when another gesture, such as a double tap, is made on the job list DJL for display.

In the above embodiment, in the case where a predetermined word or character string representing confidentiality is contained in the name of a job or an image contained as print target data in the job, the determination section 45 determines the job to be a confidential job. Instead of this, for example, in the case where the word or character string is contained in other pieces of data on the job, the determination section 45 may determine the job to be a confidential job.

The structure and processing in the above embodiment described with reference to FIGS. 1 to 10 are merely examples of the present invention and the present invention is not intended to be limited to the above structure and processing.

REFERENCE SIGNS LIST 10 image forming apparatus
11 image reading section
12 image forming section
31 control unit
32 display section
34 operating section
35 touch panel
36 network communication section
37 facsimile communication section
38 storage section
41 control section
42 display control section
43 communication control section
44 job list generating section
45 determination section
46 character recognition section

The invention claimed is:

1. An image forming apparatus comprising:
a display section;
an operating section operable by a user;
a job list generating section that generates a job list showing a plurality of executed jobs;
a determination section that, when a predetermined word or character string representing confidentiality is contained in one of the jobs, determines the job to be confidential; and
a display control section that allows the display section to display the job list generated by the job list generating section but, in presence of the job determined to be confidential by the determination section, allows the display section to display the jobs other than the job determined to be confidential on a display screen by excluding the job determined to be confidential from the job list,
wherein when a keyword is input by an operation of the operating section and the input keyword is contained in the job determined to be confidential, the display control section allows the display section to display the job determined to be confidential, and when a predetermined operation is made on the operating section while the display control section allows the display section to display the jobs other than the job determined to be confidential on the display screen by excluding the job determined to be confidential from the job list, the display control section changes a display state of the job list and allows display of the changed job list, and
the image forming apparatus further comprises a control section that, when the display state is changed by the display control section, makes the operating section ready to accept handwriting input of the keyword.

2. The image forming apparatus according to claim 1, wherein the display control section changes the display state by blurring an image of the job list.

3. The image forming apparatus according to claim 1, wherein
the operating section is a touch panel placed on the screen of the display section, and
when a specified touch gesture is made as the predetermined operation through the touch panel, the display control section changes the display state.

4. The image forming apparatus according to claim 3, wherein the specified touch gesture is a hold-down or a double tap on the touch panel.

5. An image forming apparatus comprising:
a display section;
an operating section operable by a user;
a job list generating section that generates a job list showing a plurality of executed jobs;
a determination section that, when a predetermined word or character string representing confidentiality is contained in one of the jobs, determines the job to be confidential; and
a display control section that allows the display section to display the job list generated by the job list generating section but, in presence of the job determined to be confidential by the determination section, allows the display section to display the jobs other than the job determined to be confidential on a display screen by excluding the job determined to be confidential from the job list,
wherein when a keyword is input by an operation of the operating section and the input keyword is contained in the job determined to be confidential, the display control section allows the display section to display the job determined to be confidential, and
the determination section acquires the word or character string representing confidentiality from a name of the job.

6. An image forming apparatus comprising:
a display section;
an operating section operable by a user;
a job list generating section that generates a job list showing a plurality of executed jobs;
a determination section that, when a predetermined word or character string representing confidentiality is contained in one of the jobs, determines the job to be confidential; and a display control section that allows the display section to display the job list generated by the job list generating section but, in presence of the job determined to be confidential by the determination section, allows the display section to display the jobs other than the job determined to be confidential on a display screen by excluding the job determined to be confidential from the job list, wherein when a keyword is input by an operation of the operating section and the input keyword is contained in the job determined to be confidential, the display control section allows the display section to display the job determined to be confidential, the image forming apparatus further comprises a character recognition section that analyzes an image contained in the job to recognize characters or character strings contained in the image, and the determination section acquires the word or character string representing confidentiality from among the characters or character strings recognized by the character recognition section.

\* \* \* \* \*